United States Patent
Collina et al.

(10) Patent No.: US 9,068,028 B2
(45) Date of Patent: *Jun. 30, 2015

(54) PROCESS FOR THE PREPARATION OF IMPACT RESISTANT PROPYLENE POLYMER COMPOSITIONS

(75) Inventors: Gianni Collina, Ferrara (IT); Marco Ciarafoni, Ferrara (IT); Ofelia Fusco, Ferrara (IT); Benedetta Gaddi, Ferrara (IT); Monica Galvan, S.M. Maddalena (IT); Giampiero Morini, Padua (IT); Roberto Pantaleoni, Ferrara (IT); Francesca Verrocchio, Bologna (IT)

(73) Assignee: Basell Poliolefine Italia S.r.l., Milan (IT)

( * ) Notice: Subject to any disclaimer, the term of this patent is extended or adjusted under 35 U.S.C. 154(b) by 491 days.

This patent is subject to a terminal disclaimer.

(21) Appl. No.: 13/376,893

(22) PCT Filed: Jun. 16, 2010

(86) PCT No.: PCT/EP2010/058437
§ 371 (c)(1),
(2), (4) Date: Dec. 8, 2011

(87) PCT Pub. No.: WO2010/146074
PCT Pub. Date: Dec. 23, 2010

(65) Prior Publication Data
US 2012/0083576 A1   Apr. 5, 2012

Related U.S. Application Data

(60) Provisional application No. 61/269,635, filed on Jun. 26, 2009.

(30) Foreign Application Priority Data

Jun. 19, 2009   (EP) ..................... 09163192

(51) Int. Cl.
*C08F 10/06* (2006.01)
*C08F 4/651* (2006.01)
*C08F 110/06* (2006.01)

(52) U.S. Cl.
CPC ............... *C08F 10/06* (2013.01); *C08F 110/06* (2013.01)

(58) Field of Classification Search
CPC ........ C08F 10/06; C08F 4/6492; C08F 4/651; C08F 2/001
See application file for complete search history.

(56) References Cited

U.S. PATENT DOCUMENTS

| 4,298,718 A | 11/1981 | Mayr et al. |
|---|---|---|
| 4,399,054 A * | 8/1983 | Ferraris et al. ................ 502/125 |
| 4,495,338 A | 1/1985 | Mayr et al. |
| 6,043,324 A | 3/2000 | Karbasi |
| 7,005,487 B2 | 2/2006 | Balbontin et al. |
| 7,652,108 B2 | 1/2010 | Mei et al. |
| 7,772,338 B2 | 8/2010 | Terreur et al. |
| 8,071,499 B2 | 12/2011 | Morini et al. |
| 2005/0032633 A1 | 2/2005 | Morini et al. |
| 2006/0009594 A1 | 1/2006 | Meesters et al. |
| 2007/0010625 A1 * | 1/2007 | News et al. ................ 525/240 |
| 2010/0029869 A1 | 2/2010 | Morini et al. |
| 2010/0249330 A1 | 9/2010 | Massari et al. |
| 2010/0261859 A1 * | 10/2010 | Vincenzi et al. ........... 526/125.4 |
| 2010/0273641 A1 | 10/2010 | Chen et al. |

FOREIGN PATENT DOCUMENTS

| CN | 1597714 | 3/2005 |
|---|---|---|
| CN | 1768108 A | 5/2006 |
| EP | 0728769 | 8/1996 |
| JP | H11504957 | 5/1999 |
| JP | 2002121205 | 4/2002 |
| JP | 2002542347 A | 12/2002 |
| JP | 2005531675 | 10/2005 |
| JP | 2008517083 | 5/2008 |
| JP | 2011508013 | 3/2011 |
| RU | 2325404 C2 | 5/2008 |
| WO | WO-00/63261 | 10/2000 |
| WO | WO-03054035 | 7/2003 |
| WO | WO-2004/087807 | 10/2004 |
| WO | WO-2006037705 | 4/2006 |
| WO | WO2007/122239 | 11/2007 |
| WO | WO-2007147864 | 12/2007 |
| WO | WO-2007147865 | 12/2007 |
| WO | WO2008/074674 | 6/2008 |
| WO | WO2008/077770 | 7/2008 |
| WO | WO-2009050045 A2 | 4/2009 |

* cited by examiner

Primary Examiner — Mark Kaucher

(57) ABSTRACT

A process for the preparation of propylene polymer compositions carried out in the presence of a catalyst system comprising (a) a solid catalyst component having average particle size ranging from 15 to 80 μm comprising a magnesium halide, a titanium compound having at least a Ti-halogen bond and at least two electron donor compounds one of which being present in an amount from 50 to 90% by mol with respect to the total amount of donors and selected from succinates and the other being selected from 1,3 diethers, (b) an aluminum alkyl and optionally (c) an external electron donor compound, and comprising the following steps:

(i) contacting the catalyst components (a), (b) and optionally (c);
(ii) pre-polymerizing up to forming amounts of polymer from about 0.1 up to about 1000 g per gram of solid catalyst component (a);
(iii) polymerizing propylene producing a propylene (co) polymer being for at least 85% by weight of insoluble in xylene at 25° C. and
(iv) in a successive step, carried out in gas-phase, polymerizing mixtures of ethylene with α-olefins $CH_2$=CHR in which R is a hydrocarbon radical having 1-10 carbon atoms, to produce the said ethylene copolymer.

13 Claims, No Drawings

PROCESS FOR THE PREPARATION OF IMPACT RESISTANT PROPYLENE POLYMER COMPOSITIONS

This application is the U.S. national phase of International Application PCT/EP2010/058437, filed Jun. 16, 2010, claiming priority to European Application 09163192.9 filed Jun. 19, 2009 and the benefit under 35 U.S.C. 119(e) of U.S. Provisional Application No. 61/269,635, filed Jun. 26, 2009; the disclosures of International Application PCT/EP2010/058437, European Application 09163192.9 and U.S. Provisional Application No. 61/269,635, each as filed, are incorporated herein by reference.

The present invention relates to a polymerization process for the preparation of propylene polymer compositions. The compositions obtained with this process are characterized by an excellent impact resistance/rigidity balance.

Impact resistant propylene polymer compositions are very well known in the art. Typically, they comprise a relatively high crystalline propylene polymer fraction insoluble in xylene at 25° C., and a relatively low crystallinity copolymer fraction being soluble in xylene at 25° C. The relatively high crystallinity fraction is generally a propylene homopolymer, or a random propylene copolymer with a relatively low amount of olefin comonomer, characterized by high isotacticity. The relatively low crystallinity fraction is generally a propylene copolymer and particularly a propylene-ethylene copolymer having a content of ethylene ranging from 15 to 75% wt. The said compositions can be prepared by several methods, including the mechanical blend of the two components. The preferred method however, is the preparation in-reactor by a sequence of polymerization step carried out in one or two reactor. Usually, in the first step propylene is copolymerized or copolymerized with a small amount of other olefins in order to produce the high crystallinity fraction, while in a second step carried out under different polymerization conditions and in particular in a reaction mixture comprising a higher amount of olefin comonomer, it is produced the xylene soluble fraction.

This method is largely used industrially and it is preferably carried out operating in two different reactors which can be of the same or different polymerization technology. In particular, the first stage can be carried out in a liquid phase reactor or in gas-phase reactor, while the second phase is commonly carried out in gas-phase in order to avoid the dissolution of the low crystallinity fraction in the reaction bath.

In this type of process the performances of the catalyst is very important. The catalyst system should be able to produce a very isotactic propylene (co)polymer in the first step, while in the second should be able to produce a copolymer in which the olefin comonomer units are sufficiently distributed along and among the polymer chains in order to have a copolymer with a low crystallinity, i.e., high solubility in xylene which confers impact resistance to the composition. Of course, is simultaneously requested to the catalyst a high polymerization activity in order to maintain at an acceptable level the plant productivity. Due to the presence of multiple polymerization step and to the fact that a certain weight balance among the two polymer fractions must be kept, the catalyst needs to maintain an acceptable level of polymerization activity over the time and in particular should be able to maintain the necessary level of reactivity in gas-phase.

Moreover, the catalyst should have the necessary morphology versatility to withstand the initial stage of polymerization where the crystalline polymer is produced while at the same time maintaining the capability to prevent that in a successive step the soluble polymer fraction exits the polymer/catalyst growing granule and adhere to the reactor.

It is therefore clear that the catalyst system is requested a versatility which is very demanding to find in a single catalyst. In fact, WO03/054035 teaches to use a combination of two different catalysts in order to have simultaneously high productivity and sufficient porosity for the preparation of the soluble polymer fraction. The use of catalyst mixtures however, introduces some complexity into the handling catalyst section of the plant which would require more devices in order to correctly use them. Moreover, as each single catalyst of the mixture is produced by a separated batch run, the likelihood to have variations on the final catalyst is doubled and so is the likelihood to have of a polymer composition out of specification.

Moreover, due to the presence of different polymerization stages under different conditions the behavior of a catalyst and in particular of a mixture of a catalyst is hardly predictable. In fact, each catalyst may have a different behavior in respect of certain polymerization conditions and the specific results would need to be checked. A catalyst, or mixture of catalyst, may for example have an excellent activity but poor properties in terms of xylene soluble polymer material incorporation. Accordingly, documents that only very generically disclose suitability of a catalyst or mixture of catalysts for preparation of impact propylene copolymers do not actually convey any concrete teaching in the absence of a working example. This is the case for example of WO2007/147864 and WO2007/147865.

The first document suggests using a blend of two Ziegler-Natta catalysts containing a succinate and a diether respectively. The second one teaches to use one catalyst containing a blend of the two donors. In both cases the object is to obtain a propylene polymer product having characteristics intermediate among those of the products obtained by the use of the single catalysts. Said documents mention very generally, without any concrete example, that the proposed solution could be suitable for production of propylene heterophasic copolymers. However, said documents do not give concrete indications on how to select the specific catalyst and on how to treat it in order to have good performances in terms of morphological stability and ability to incorporate the xylene soluble phase, It is therefore still felt the need of a process for the preparation of impact resistant polypropylene compositions employing a catalyst system able to offer at the same time high polymerization activity, good morphological stability, optimal xylene soluble phase incorporation, high isotacticity, such that the final composition have a good impact/stiffness balance.

It is therefore an object of the present invention a process for the preparation of propylene polymer compositions comprising from 50 to 90% by weight of a propylene polymer fraction insoluble in xylene at 25° C., and from 10 to 50% by weight of an ethylene copolymer fraction soluble in xylene at 25° C., said process being carried out in the presence of a catalyst system comprising (a) a solid catalyst component having average particle size ranging from 15 to 80 μm comprising a magnesium halide, a titanium compound having at least a Ti-halogen bond and at least two electron donor compounds one of which being present in an amount from 50 to 90% by mol with respect to the total amount of donors and selected from succinates and the other being selected from 1,3 diethers, (b) an aluminum alkyl and optionally (c) an external electron donor compound, and comprising the following steps (i) contacting the catalyst components (a), (b) and optionally (c) for a period of time ranging from 0.1 to 120 minutes, at a temperature ranging from 0 to 90° C.;

(ii) pre-polymerizing with one or more olefins of formula $CH_2=CHR$, where R is H or a C1-C10 hydrocarbon group, up to forming amounts of polymer from about 0.1 up to about 1000 g per gram of solid catalyst component (a);

(iii) polymerizing propylene in the optional presence of ethylene and/or $C_4$-$C_{10}$ alpha olefins producing a propylene (co)polymer being for at least 85% by weight of insoluble in xylene at 25° C. and (iv) in a successive step, carried out in gas-phase, in the presence of the product coming from (iii), polymerizing mixtures of ethylene with α-olefins $CH_2=CHR$ in which R is a hydrocarbon radical having 1-10 carbon atoms, to produce an ethylene copolymer.

Preferably, the succinate present in the solid catalyst component (a) is selected from succinates of formula (I) below

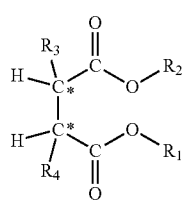

(I)

in which the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, C3-C20 cycloalkyl, C5-C20 aryl, arylalkyl or alkylaryl group with the proviso that at least one of them is a branched alkyl; said compounds being, with respect to the two asymmetric carbon atoms identified in the structure of formula (I), stereoisomers of the type (S,R) or (R,S).

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

Particularly preferred are the compounds in which the $R_3$ and/or $R_4$ radicals are secondary alkyls like isopropyl, sec-butyl, 2-pentyl, 3-pentyl or cycloakyls like cyclohexyl, cyclopentyl, cyclohexylmethyl. Examples of the above-mentioned compounds are the (S,R) (S,R) forms pure or in mixture, optionally in racemic form, of diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Among the 1,3-diethers mentioned above, particularly preferred are the compounds of formula (I)

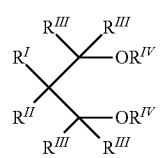

(I)

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1-6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

Furthermore, particularly preferred are the 1,3-diethers of formula (II)

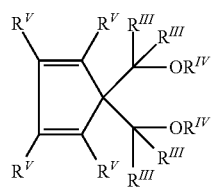

where the radicals $R^{IV}$ have the same meaning explained above and the radicals $R^{III}$ and $R^{V}$ radicals, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals and two or more of the $R^{V}$ radicals can be bonded to each other to form condensed cyclic structures, saturated or unsaturated, optionally substituted with $R^{VI}$ radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; said radicals $R^{V}$ and $R^{VI}$ optionally containing one or more heteroatoms as substitutes for carbon or hydrogen atoms, or both.

Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^{V}$ radicals are bonded to each other to form one or more condensed cyclic structures, preferably benzenic, optionally substituted by $R^{VI}$ radicals. Specially preferred are the compounds of formula (III):

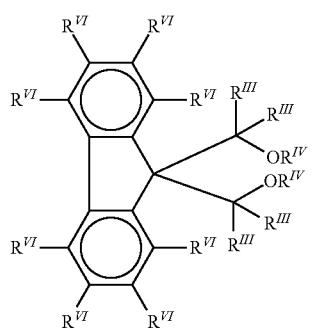

where the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (II).

Specific examples of compounds comprised in formulae (II) and (III) are:

1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

As explained above, the catalyst component (a) comprises, in addition to the above electron donors, a titanium compound having at least a Ti-halogen bond and a Mg halide. The magnesium halide is preferably $MgCl_2$ in active form which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n−1 X is halogen and R is a hydrocarbon radical having from 1 to 10 carbon atoms.

Preferably, the catalyst component (a) has an average particle size ranging from 20 to 70 μm and more preferably from 25 to 65 μm. As explained the succinate is present in amount ranging from 50 to 90% by weight with respect to the total amount of donors. Preferably it ranges from 60 to 85% by weight and more preferably from 65 to 80% by weight. The 1,3-diether preferably constitutes the remaining amount with respect to the total amount of donors.

The alkyl-Al compound (b) is preferably chosen among the trialkyl aluminum compounds such as for example triethylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1, trifluoropropyl-metil-dimethoxysilane. The external electron donor compound is used in such an amount to give a molar ratio between the organo-aluminum compound and said electron donor compound of from 5 to 500, preferably from 7 to 400 and more preferably from 10 to 200.

In step i) the catalyst forming components are preferably contacted with a liquid inert hydrocarbon solvent such as, e.g., propane, n-hexane or n-heptane, at a temperature below about 60° C. and preferably from about 0 to 30° C. for a time period of from about six seconds to 60 minutes.

The above catalyst components (a), (b) and optionally (c) are fed to a pre-contacting vessel, in amounts such that the weight ratio (b)/(a) is in the range of 01-10 and if the compound (c) is present, the weight ratio (b)/(c) is preferably as defined above. Preferably, the said components are pre-contacted at a temperature of from 10 to 20° C. for 1-30 minutes. The precontact vessel can be either a stirred tank or a loop reactor.

The precontacted catalyst is then fed to the prepolymerization reactor where step (ii) takes place. The prepolymerization step is carried out in a first reactor selected from a loop reactor or a continuously stirred tank reactor. The prepolymerization can be carried out either in gas-phase or in liquid-phase. Preferably it is carried out in liquid-phase. The liquid medium comprises liquid alpha-olefin monomer(s), optionally with the addition of an inert hydrocarbon solvent. Said hydrocarbon solvent can be either aromatic, such as toluene, or aliphatic, such as propane, hexane, heptane, isobutane, cyclohexane and 2,2,4-trimethylpentane. The amount of hydrocarbon solvent, if any, is lower than 40% by weight with respect to the total amount of alpha-olefins, preferably lower than 20% by weight. Preferably, step (ii) is carried out in the absence of inert hydrocarbon solvents.

The average residence time in this reactor generally ranges from 2 to 40 minutes, preferably from 10 to 25 minutes. The temperature is comprised between 10° C. and 50° C., preferably between 20° C. and 40° C. Adopting these conditions allows to obtain a pre-polymerization degree in the preferred range from 60 to 800 g per gram of solid catalyst component, preferably from 150 to 500 g per gram of solid catalyst component. Step (ii) is further characterized by a low concentration of solid in the slurry, typically in the range from 50 g to 300 g of solid per liter of slurry.

The slurry containing the prepolymerized catalyst is discharged from the pre-polymerization reactor and fed to the reactor where step (iii) takes place. Step (iii) can be carried out either in gas-phase or in liquid phase. The gas-phase process can be carried out in a fluidized or stirred, fixed bed reactor or in a gas-phase reactor comprising two interconnected polymerization zones one of which, working under fast fluidization conditions and the other in which the polymer flows under the action of gravity. The liquid phase process can be either in slurry, solution or bulk (liquid monomer). This latter technology is the most preferred and can be carried out in various types of reactors such as continuous stirred tank reactors, loop reactors or plug-flow ones. The polymerization is generally carried out at temperature of from 20 to 120° C., preferably of from 40 to 85° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Preferably, the step (iii) is carried out by polymerizing in liquid monomer, preferably in loop reactor, propylene, optionally in mixture with ethylene and/or $C_4$-$C_{10}$ alpha olefins, to give the propylene polymer of the required xylene insolubility.

In this stage and/or in the successive stage, hydrogen can be used as a molecular weight regulator. The propylene polymer obtained in this stage has a xylene insolubility preferably higher than 90% and more preferably higher than 95%, an isotactic index in terms of content of isotactic pentads (determined with C13-NMR on the whole polymer) higher than 93% and preferably higher than 95%. The Melt Flow Rate value according to ISO 1133 (230° C., 2.16 Kg) can vary within a wide range going from 0.01 to 300 g/10 min and particularly from 0.1 to 0.250 g/10 min.

In the second stage of the particularly preferred polymerization process, the propylene/ethylene copolymer (B) is produced in a conventional fluidized-bed gas-phase reactor in the presence of the polymeric material and the catalyst system coming from the preceding polymerization step. The polymerization mixture is discharged from the downcomer to a gas-solid separator, and subsequently fed to the fluidized-bed gas-phase reactor operating under conventional conditions of temperature and pressure.

The polymer produced in (iv) is preferably an ethylene copolymer containing from 15 to 75% wt of a C3-C10 alpha olefin, optionally containing minor proportions of a diene, being for at least 60% soluble in xylene at room temperature. Preferably the alpha olefin is selected from propylene or butene-1 and its content ranges preferably from 20 to 70% wt.

The final polymer composition obtained through the process of the invention preferably comprises 30-90 parts by weight, preferably 40-80 parts by weight of (A) a propylene polymer optionally containing minor amounts of ethylene and/or $C_4$-$C_{10}$ alpha olefins being insoluble in xylene at 25° C. and 10-70 preferably 20-60 parts by weight of (B) an ethylene copolymer soluble in xylene preferably containing from 20 to 70% of C3-C10 alpha olefin. The said propylene polymer compositions having a ratio between the intrinsic viscosities of the polymer produced in (iii) and that of the polymer produced in (iv) in tetrahydronaphthalene at 135° C. of the portion soluble in xylene and of the portion insoluble in xylene at room temperature of from 0.3 to 5.

The total ethylene content is higher than 9%, preferably higher than 10% and more preferably ranging from 10 to 50% by weight.

The value of the intrinsic viscosity of the xylene soluble fraction determined on the reactor grade polymer composition ranges from 0.5 dl/g to 6.0 dl/g.

The compositions obtained according to the process of the invention can be obtained as reactor grade with a Melt Flow Rate value according to ISO 1133 (230° C., 2.16 Kg) ranging from 0.01 to 100 g/10 min, preferably from 0.1 to 70 and more preferably from 0.2 to 60. If desired they can be visbroken according to known technique in order to reach the final MFR value suited for the selected application. The chemical degradation of the polymer (visbreaking) is carried out in the presence of free radical initiators, such as peroxides. Examples of radical initiators that can be used for this purpose are 2,5-dimethyl-2,5-di(tert-butylperoxide)-hexane and dicumyl-peroxide. The degradation treatment is carried out by using the appropriate quantities of free radical initiators, and preferably takes place in an inert atmosphere, such as nitrogen. Methods, apparatus, and operating conditions known in the art can be used to carry out this process.

The so obtained propylene copolymers are characterized by an excellent balance among impact resistance and stiffness. The flexural modulus, determined according to ISO 178, is higher than 900 Mpa, preferably higher than 1200 Mpa and more preferably higher than 1400 MPa. The impact strength of the composition tested at 0° C. ranges from 1 to 30 KJ/m$^2$ while at −20° C. it is comprised from 5 to 10 KJ/m$^2$. Other preferred features of the composition obtained by the process of the invention are:
- a molecular weight distribution in component (A), expressed by the $\overline{M}w/\overline{M}n$ ratio, measured by GPC, equal to or higher than 6-10, typically 6-9;
- a value of $\overline{M}z/\overline{M}w$ ratio in component (A), measured by GPC, equal to or higher than 2.5, in particular from 2.5 to 4.5, typically 3-4; and
- Flexural Modulus from 700 to 1500 MPa, more preferably from 900 to 1300 Mpa.

The compositions of the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert.-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as flexural modulus and HDT. Talc can also have a nucleating effect.

EXAMPLES

The data of the propylene polymer materials were obtained according to the following methods:
Xylene-Soluble Faction
2.5 g of polymer and 250 mL of o-xylene are introduced in a glass flask equipped with a refrigerator and a magnetical stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and the filtered liquid is divided into two 100 ml aliquots. One 100 ml aliquot of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Comonomer (C2) Content
By IR spectroscopy.
The comonomer content of the Component B is determined on the precipitated "amorphous" fraction of the polymer. The precipitated "amorphous" fraction is obtained as follows: to one 100 ml aliquot of the filtered liquid obtained as described above 200 ml of acetone are added under vigorous stirring. Precipitation must be complete as evidenced by a clear solid-solution separation. The solid thus obtained is filtered on a metallic screen and dried in a vacuum oven at 70° C. until a constant weight is reached.

Molar Ratio of Feed Gasses
Determined by gas-chromatography
Melt Flow Rate (MFR)
Determined according to ISO 1133 (230° C., 2.16 Kg)
Intrinsic Viscosity
Determined in tetrahydronaphthalene at 135° C.
Flexural Modulus
Determined according to ISO 178
Stress at Yield and at Break
Determined according to ISO 527
Elongation at Yield and Break
Determined according to ISO 527
IZOD Impact Strength
Determined according to ISO 180/1A
Ductile/Brittle Transition Temperature (D/B)

According to this method, the bi-axial impact resistance is determined through impact with an automatic, computerized striking hammer.

The circular test specimens are obtained by cutting with circular hand punch (38 mm diameter). They are conditioned for at least 12 hours at 23° C. and 50 RH and then placed in a thermostatic bath at testing temperature for 1 hour. The force-time curve is detected during impact of a striking hammer (5.3 kg, hemispheric punch with a ½" diameter) on a circular specimen resting on a ring support. The machine used is a CEAST 6758/000 type model no. 2.

D/B transition temperature is the temperature at which 50% of the samples undergoes fragile break when submitted to the above-mentioned impact test.

The plaques for D/B measurements, having dimensions of 127×127×1.5 mm are prepared according to the following method.

The injection press is a Negri Bossi™ type (NB 90) with a clamping force of 90 tons. The mould is a rectangular plaque (127×127×1.5 mm).

The main process parameters are reported below:
Back pressure (bar): 20
Injection time (s): 3
Maximum Injection pressure (MPa): 14
Hydraulic injection pressure (MPa): 6-3
First holding hydraulic pressure (MPa): 4±2
First holding time (s): 3
Second holding hydraulic pressure (MPa): 3±2

Second holding time (s): 7
Cooling time (s): 20
Mould temperature (° C.): 60
The melt temperature is between 220 and 280° C.

Melting Temperature, Melting Enthalpy and Crystallization Temperature

Determined by DSC with a temperature variation of 20° C. per minute

Average Particle Size of the Adduct and Catalysts

Determined by a method based on the principle of the optical diffraction of monochromatic laser light with the "Malvern Instr. 2600" apparatus. The average size is given as P50.

Examples 1-5

Example 1

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2.2.1C_2H_5OH$ having average particle size of 47 μm (prepared in accordance with the method described in example 1 of EP728769, an amount of diethyl 2,3-diisopropylsuccinate in racemic form such as to have a Mg/succinate molar ratio of 12 was added. The temperature was raised to 100° C. and kept at this value for 60 min. After that the stirring was stopped, the liquid siphoned off and the treatment with $TiCl_4$ was repeated at 110° C. for 30 min. After siphoning, fresh $TiCl_4$ and an amount of 9,9-bis(methoxymethyl)fluorene such as to have a Mg/succinate molar ratio of 12 were added. Then the temperature was raised to 90° C. for 30 min. After sedimentation and siphoning at 85° C. the solid was washed six times with anhydrous hexane (6.times.100 ml) at 60° C.

Catalyst System and Prepolymerization Treatment

Before introducing it into the polymerization reactors, the solid catalyst component described above is contacted with aluminum triethyl (TEAL) and dicyclopentyldimethoxysilane (DCPMS) under the conditions reported in Table 1. The catalyst system is then subjected to prepolymerization by maintaining it in suspension in liquid propylene under the conditions reported in table 1 before introducing it into the first polymerization reactor.

Polymerization

The polymerization run is conducted in continuous mode in a series of two reactors equipped with devices to transfer the product from one reactor to the one immediately next to it. The first reactor is a liquid phase loop reactor, and the second is a fluidized bed gas-phase reactor. A propylene homopolymer is prepared in the liquid loop reactor while an ethylene copolymer is prepared in the gas-phase reactor in the presence of the propylene homopolymer coming from the first stage. Hydrogen is used as molecular weight regulator.

The gas phase (propylene, ethylene and hydrogen) is continuously analyzed via gas-chromatography.

At the end of the run the powder is discharged and dried under a nitrogen flow.

The main polymerization conditions and the analytical data relating to the polymers produced in the three reactors are reported in Table 1.

Comparison Example 1

The polymerization was carried out with the same catalyst and under the conditions described for example 1 with the differences that step (ii) was not carried out.

TABLE 1

| PROCESS CONDITIONS | | | | | | |
|---|---|---|---|---|---|---|
| | Ex. 1 | Ex. 2 | Ex. 3 | Ex. 4 | Ex. 5 | Comp. 1 |
| Precontact | | | | | | |
| Temperature ° C. | 15 | 15 | 15 | 15 | 15 | 15 |
| Residence time (min) | 24 | 23 | 15 | 18 | 15 | 23 |
| Teal/donor ratio | 77 | 12 | 30 | 8 | 10 | 10 |
| Prepolymerization | | | | | | |
| Temperature ° C. | 20 | 20 | 20 | 20 | 20 | — |
| Residence time (min) | 9 | 8.5 | 9 | 8 | 8 | — |
| Pre-polymerization degree g/gcat | 350 | 380 | 410 | 390 | 430 | |
| Loop $1^{st}$ reactor in liquid phase - propylene homopolymer | | | | | | |
| Temperature, ° C. | 70 | 70 | 70 | 70 | 75 | 70 |
| Pressure, bar | 40 | 40 | 39 | 40 | 40 | 40 |
| Residence time, min | 66 | 68 | 72 | 70 | 65 | 68 |
| $H_2$ feed mol ppm | 3200 | 4000 | 2300 | 3700 | 4000 | 4000 |
| Xylene Solubles % | 2.7 | 2.3 | 2.2 | 2.1 | 1.9 | 3.6 |
| Split, wt % | 73 | 81 | 71 | 82 | 81 | 80 |
| Gas-Phase reactor - ethylene/propylene copolymerization | | | | | | |
| Temperature, ° C. | 80 | 80 | 80 | 80 | 80 | 80 |
| Pressure, bar | 15 | 15 | 19 | 15 | 15 | 15 |
| Residence time, min | 23 | 25 | 29 | 16 | 25 | 15 |
| $C_2^-/C_2^- + C_3^-$, % | 0.38 | 0.38 | 0.29 | 0.32 | 0.29 | 0.38 |
| $H_2/C_2^-$, % | 0.035 | 0.041 | | 0.07 | 0.08 | 0.040 |
| Split, wt % | 27 | 19 | 29 | 18 | 19 | 20 |
| % C2 in copolymer | 47 | 49 | 40 | 44 | 41 | 45 |

TABLE 1-continued

| | Ex. 1 | Ex. 2 | Ex. 3 | Ex. 4 | Ex. 5 | Comp. 1 |
|---|---|---|---|---|---|---|
| PROCESS CONDITIONS | | | | | | |
| Activity (Kg/g) | 71 | 46 | 57 | 41 | 38 | 29 |
| Bulk density g/cc | 0.46 | 0.47 | nd | 0.463 | 0.46 | 0.38 |
| % broken spheres | 3.3 | 2.7 | 2.5 | 3.9 | 2.9 | 9.5 |
| Polymer properties | | | | | | |
| MFR (g/10') | 23.8 | 38.8 | 18.2 | 49 | 46 | 45 |
| Xylene solubles | 22.4 | 21.1 | 27 | 17.2 | 18 | 28 |
| XSIV | 2.83 | 3.05 | 3.0 | 2.26 | 2.37 | nd |
| Flex Mod | 1239 | 1433 | 1082 | 1565 | 1466 | 1207 |
| Izod at 23° C. | 8.9 | 6.1 | 16.3 | 3.8 | 4.8 | 4.8 |
| Izod at 0° C. | 5.9 | 4.5 | 9.2 | 3.4 | 4.6 | 2.9 |
| Izod at −20° C. | 4.9 | 3.9 | 6.7 | 3.2 | 3.8 | 1.6 |
| Tens. Strength at yield | 22.2 | 22.2 | 20.1 | 27.8 | 26.3 | Nd |
| Elongation at break | 50 | 12 | 170 | 23 | 43 | nd |

Notes:
$H_2$ bulk = hydrogen concentration in the liquid monomer; $C_2^=$ = ethylene; $C_3^=$ = propylene; Split = amount of polymer prepared in the concerned reactor, referred to the total weight;

The invention claimed is:

1. A process for the preparation of a propylene polymer composition comprising from 50 to 90% by weight of a propylene polymer fraction insoluble in xylene at 25° C., and from 10 to 50% by weight of an ethylene copolymer fraction soluble in xylene at 25° C., said process being carried out in the presence of a catalyst system comprising (a) a solid catalyst component having average particle size ranging from 15 to 80 μm comprising a magnesium halide, a titanium compound having at least a Ti-halogen bond and at least two internal electron donor compounds one of which being present in an amount from 50 to 90% by mol with respect to the total amount of donors and selected from succinates and the other being selected from 1,3 diethers, (b) an aluminum alkyl and optionally (c) an external electron donor compound, the process comprising the following steps:

(i) contacting the catalyst components (a), (b) and optionally (c) for a period of time ranging from 0.1 to 120 minutes, at a temperature ranging from 0 to 90° C.;

(ii) pre-polymerizing with at least one olefin of formula $CH_2=CHR$, where R is H or a C1-C10 hydrocarbon group, up to forming amounts of polymer from about 0.1 to about 1000 g per gram of solid catalyst component (a);

(iii) polymerizing propylene in the optional presence of at least one of ethylene and/or $C_4$-$C_{10}$ alpha olefins, thereby producing a propylene (co)polymer being at least 85% by weight of insoluble in xylene at 25° C. and (iv) in a successive step, carried out in gas-phase, in the presence of the product coming from (iii), polymerizing mixtures of ethylene with α-olefins $CH_2=CHR$ wherein R is a hydrocarbon radical having 1-10 carbon atoms, to produce the said ethylene copolymer wherein the propylene polymer composition has a ratio between the intrinsic viscosities of the propylene (co) polymer and that of the ethylene copolymer in tetrahydronaphthalene at 135° C. of the portion soluble in xylene and of the portion insoluble in xylene at room temperature from 0.3 to 5; and wherein the propylene polymer composition has an impact strength determined according to ISO 180/1A at −20° C. from 5 to 10 KJ/m².

2. The process according to claim 1 wherein the succinate present in the solid catalyst component (a) is selected from succinates of formula (I) below

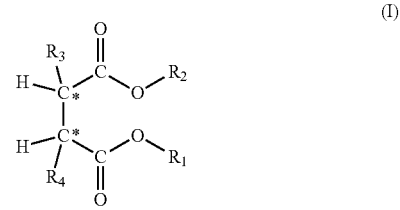

(I)

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, C3-C20 cycloalkyl, C5-C20 aryl, arylalkyl or alkylaryl group with the proviso that at least one of them is a branched alkyl; said compounds being, with respect to the two asymmetric carbon atoms identified in the structure of formula (I), stereoisomers of the type (S,R) or (R,S).

3. The process according to claim 2, wherein the 1,3-diethers, are the compounds of formula (II):

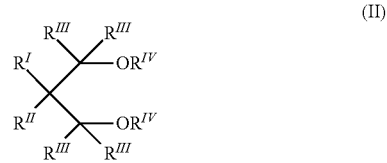

(II)

where $R^I$ and $R^{II}$ are the same or different and are hydrogen or linear or branched $C_1$-$C_{18}$ hydrocarbon groups which can also form least one cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of and $R^I$ to $R^{IV}$ groups can contain heteroatoms selected from halogens, N, O, S and Si.

4. The process according to claim 1 wherein the catalyst component (a) comprises a titanium compound having at least a Ti-halogen bond and a Mg halide.

5. The process according to claim 1 wherein the catalyst component (a) has an average particle size ranging from 20 to 70 μm.

6. The process according to claim 1 wherein the succinate is present in amount ranging from 50 to 90% by weight with respect to the total amount of donors and the 1,3-diether constitutes the remaining amount with respect to the total amount of donors.

7. The process according to claim 1 wherein in step a) the catalyst forming components are contacted with a liquid inert hydrocarbon solvent at a temperature below about 60° C. and for a time period of from about six seconds to 60 minutes.

8. The process according to claim 1 wherein in step i) the catalyst components (a), (b) and optionally (c) are fed to a pre-contacting vessel, in amounts such that the weight ratio (b)/(a) is in the range of 01-10 and if the compound (c) is present, the weight ratio (b)/(c) ranges from 10 to 200.

9. The process according to claim 1 wherein the step ii) is carried out in liquid-phase.

10. The process according to claim 9 wherein the step ii) is carried out in liquid propylene.

11. The process according to claim 1 wherein the pre-polymerization degree ranges from 60 to 800 g per gram of solid catalyst component.

12. The process according to claim 1 wherein step iii) is carried out in liquid monomer.

13. The process of claim 1 wherein the polymer produced in (iv) is an ethylene copolymer containing from 15 to 75% wt of a C3-C10 alpha olefin.

* * * * *